United States Patent [19]
Shogren et al.

[11] Patent Number: 6,146,573
[45] Date of Patent: Nov. 14, 2000

[54] METHOD FOR PRODUCING DISPOSABLE THIN-WALLED MOLDED ARTICLES

[75] Inventors: Randal L. Shogren, Peoria; John W. Lawton, Jr., Chillicothe, both of Ill.; Karl Tiefenbacher, Richmond, Va.

[73] Assignee: E. Khashoggi Industries, LLC, Santa Barbara, Calif.

[21] Appl. No.: 08/990,345

[22] Filed: Dec. 15, 1997

Related U.S. Application Data

[63] Continuation of application No. PCT/AT96/00107, Jun. 14, 1996.

[51] Int. Cl.[7] ....................................................... B28B 5/00
[52] U.S. Cl. ........................... 264/241; 264/53; 264/257; 264/260; 264/345; 426/512; 426/514; 426/520
[58] Field of Search ....................... 264/53, 186, DIG. 5, 264/241, 257, 260, 345, 430, 431, 51, 629, 632, 642, 653, 503, 510, 521, 239, 297.2, 349; 426/138, 139, 303, 106, 549, 512, 514, 520

[56] References Cited

U.S. PATENT DOCUMENTS

| | | | |
|---|---|---|---|
| 4,644,733 | 2/1987 | Dolinar | 53/472 |
| 4,673,438 | 6/1987 | Wittwer et al. | 106/126 |
| 4,830,866 | 5/1989 | Manser et al. | 426/451 |
| 4,863,655 | 9/1989 | Lacourse et al. | 264/53 |
| 4,957,754 | 9/1990 | Munk et al. | 426/138 |
| 5,095,054 | 3/1992 | Lay et al. | 524/47 |
| 5,376,320 | 12/1994 | Tiefenbacher et al. | |

FOREIGN PATENT DOCUMENTS

0513106B1  11/1992  European Pat. Off. .

*Primary Examiner*—Merrick Dixon
*Attorney, Agent, or Firm*—Workman, Nydegger & Seeley

[57] ABSTRACT

Disposable, thin-walled molded articles, such as cups, plates, fast-food packages, trays, flat sheets and the like are produced by applying a starch-based baking composition onto the lower mold part of a multi-part, preferably two-part mold, and by baking and conditioning the composition to a moisture content of between 6 and 22% by weight. The baking composition, in addition to water and a starch or starch mixtures and/or flour or flour mixtures and/or starch derivatives, contains a fat-free or oil-free release agent and, optionally, other typical additives. Polyvinyl alcohol is added to the baking mixture in quantities of 0.5 to 40% by weight, relative to the starch component. The polyvinyl alcohol has a degree of polymerization of over 1000, preferably over 1600 and in particular over 2000, and the proportion of water is 100 to 360% by weight, relative to the starch component. Polyvinyl alcohol can be added either in dry form or in the form of an aqueous solution.

27 Claims, No Drawings

6,146,573

METHOD FOR PRODUCING DISPOSABLE THIN-WALLED MOLDED ARTICLES

CROSS-REFERENCE TO RELATED APPLICATION

This application is a continuation of international application PCT/AT96/00107, filed Jun. 14, 1996 which designated the United States.

BACKGROUND OF THE INVENTION

Field of the Invention

The present invention relates to a method for producing disposable, thin-walled molded articles, such as cups, plates, fast-food packages, trays, flat sheets and the like by applying a starch-based baking composition onto the lower mold part of a multi-part, preferably two-part mold, baking and conditioning to a moisture content of 6% by weight to 22% by weight, the baking composition, in addition to water and a starch or starch mixtures and/or flour or flour mixtures and/or starch derivatives, contains a release agent, namely one or more medium- or long-chained, optionally substituted fatty acids and/or salts thereof and/or acid derivatives thereof, such as acid amides, and/or a polymethyl hydrogen siloxanes, and optionally:

thickening agents, such as swelling starch, pregelatized starch or baking waste, and/or guar flour, pectin, carob seed flour, carboxymethylcellulose and/or gum arabic;

fibrous materials, such as cellulose-rich raw materials, plant materials, fibers of plastic, glass, metal and carbon materials;

nonfibrous filler materials, such as calcium carbonate, coal, talcum, titanium dioxide, silica gel, aluminum oxide, shellac, soy protein, powdered wheat gluten, powdered egg white from chicken eggs, powdered casein;

powdered pigments;

a zirconium salt, preferably ammonium zirconium carbonate and/or ammonium zirconium acetate, as structural stabilizers;

preservatives and antioxidants.

Molded articles produced with these prior art baking compositions still have a number of disadvantages. For instance, at relatively low humidity, approximately below 50%, in conjunction with slow moisture desorption, these molded articles exhibit ever-increasing brittleness.

This makes itself felt especially disadvantageously in two areas:

1. Over the course of long-term storage and in heated rooms during the winter, the relative humidity is often below 20%, or even below 10%.
2. In molded articles or molded article parts that are exposed to increasing bending strain: as an example, drinking glasses (compression strain during use) or two-piece hinged molded articles ("clamshells"), where the hinge is likely subjected to repeated opening and closing operations (requiring increased flexibility).

Another disadvantage of molded articles of starch, precisely in comparison with cellulose-based materials (paper, cardboard) is the virtually complete loss of tear strength if they become soaked.

Polyvinyl alcohol is a biodegradable synthetic polymer that has long been used for water-soluble films, in paper processing, and in textile impregnation. Its use together with types of starch is known from the production of cast films and from extrusion technology.

U.S. Pat. No. 3,312,641 to Young teaches that films cast from aqueous solution and comprising amylose or amylose-rich starch and polyvinyl alcohol, have greater tensile strength and are more stretchable, at 23 and 50% relative humidity, than pure starch films.

U.S. Pat. No. 3,949,145 to Otey describes similar improvements in sheets made of normal cornstarch (27% amylose), used jointly with formaldehyde for cross-linking.

U.S. Pat. No. 5,095,054 to Lay et al. and European Patent Application EP 0 400 531 A1 (Bastioli et al.) describe the melt extrusion of starch, water and polyvinyl alcohol to form a homogeneous melt. These references state that improved dimensional stability at high humidity is found.

According to U.S. Pat. No. 4,863,655 to Lacourse, a homogeneous melt of amylose-rich starches, water and up to 10% polyvinyl alcohol is again extruded. The result obtained is an expanded foam (filler chips).

Methods for producing foamed molded articles of starch from baking compositions by gelatinization without creating homogeneous melts beforehand are known from U.S. Pat. No. 5,376,320 to Tiefenbacher et al. (corresp. European Patent Disclosure EP 513 106 B1).

A decrease in brittleness at relatively low humidity and an increase in flexibility and water resistance of such molded articles with starch is desirable and could greatly expand their fields of application.

However, the art has had reservations with regard to the well-known adhesive action of polyvinyl alcohol.

In a baking method at temperatures of around 200° C., the question of thermal stability and formation of residues on the hot mold surfaces must also be taken into account.

Not least because of the known rheological properties of the starch—"dilatory" viscous behavior with the danger of seizing of pumps from friction at high viscosity, for instance—the use of high-viscosity additives, such as polyvinyl alcohol, appears inadvisable. On the other hand, with major dilution with water in this process technique and an attendant decrease in the proportion of dry substance and increase in the water "leavening" in the baking compositions, it is known that only lightweight, fragile molded parts, and in some cases only molded parts that are not cohesive, or parts that foam markedly out of the mold can now be produced.

Surprisingly, it has now been discovered that most of these prejudices are unjustified, as long as certain factors, described in further detail below, are taken into account.

SUMMARY OF THE INVENTION

It is accordingly an object of the invention to provide a method for producing disposable thin-walled molded articles, which overcomes the above-mentioned disadvantages of the heretofore-known devices and methods of this general type.

With the foregoing and other objects in view there is provided, in accordance with the invention, a method for producing disposable, thin-walled molded articles, which comprises:

providing a multi-part mold, preferably a two-part mold with a lower mold member;

preparing a starch-based baking composition with a starch component selected from the group consisting of starch, starch mixtures, flour, flour mixtures, and starch derivatives; adding water at a proportion of 100 to 360% by weight, relative to the starch component, and a mold release agent;

adding polyvinyl alcohol in quantities of 0.5 to 40% by weight, relative to the starch component, to the baking composition, wherein the polyvinyl alcohol has a degree of polymerization of over 1000;

feeding the starch-based baking composition into the lower mold member; and baking and conditioning the baking composition to an initial moisture content of about 2–4% by weight. Thereafter, the moisture content of the composition if allowed to equilibrate with the moisture in the ambient to a level of about 6–22%, and preferably to a level of about 7–12%. Maintaining the moisture content within these limits is important to the strength characteristics of the products of the invention.

The expression "thin-walled material" as used herein is intended to mean that the thickness of the material from which the article of manufacture is shaped is at least about one to two orders of magnitude less that the size of the article itself. For example, the drinking cups, plates, fast-food packages, etc. contemplated herein typically have a wall thickness on the order of about 0.5–3 mm as compared to an overall dimension of the article on the order of about 50–300 mm.

Products with improved flexibility, increased water resistance and better compatibility and hence adhesion for hydrophobic cover layers are obtained if polyvinyl alcohol in quantities of 0.5 to 40% by weight, relative to starch mass, is added to the baking mixture, if the polyvinyl alcohol has a degree of polymerization of over 1000, preferably over 1600 and in particular over 2000, and if the proportion of water is 100 to 360% by weight, relative to starch products.

The products produced by the method of the invention have the following features of interest, particularly with a view to process technology:

1. After baking, the products do not adhere to the baking molds, even though polyvinyl alcohol is a known hot-melt adhesive and softens above its glass transition temperature of about 80° C. This might be ascribed to the fact that polyvinyl alcohol, on heating and drying at high temperatures (below the melting point, which depending on the type, is between 185 and 230° C.), crystallizes rapidly.

X-ray diffraction analyses for molded articles of pure starch exhibit an amorphous diffraction pattern, while in the presence of polyvinyl alcohol, crystalline structures are found.

This crystallinity is also a kind of physical cross-linking, by which the absorption of water and the attendant structural softening are reduced.

In contrast, extruded starch and polyvinyl alcohol foams exhibit less crystallinity, since there is no opportunity for agglomeration in the production process.

2. The "baked" starch and polyvinyl alcohol foams remain partly phase-separate. Electron micrographs of the surface of such molded articles show swollen starch grains embedded in a polyvinyl alcohol matrix, while the interior instead looks homogeneous. The mixture remains phase-separate, since in contrast to extrusion no mixing action or only slight mixing action ensues during baking, and polyvinyl alcohol and starch are largely incompatible. Polyvinyl alcohol, which is a stronger and more-flexible polymer than starch, is suspected of binding together the swollen starch grains and thus increases the mechanical strength and stability of the molded articles. Extruded starch and polyvinyl alcohol foams, conversely, undergo intensive mixing, which is associated with the dissolution of the starch grain structure.

3. Since the final mold is formed directly during the baking process, cross-linking aids which increase the stability and water resistance can be admixed. This is not possible in the extrusion process, because a highly cross-linked material would not be adequately flowable.

It is advantageous in the process of the invention, before the addition of water, to add from 0.5 to 40% by weight, preferably from 0.5 to 24% by weight, relative to starch product, polyvinyl alcohol in dry form as fine powder to the other powdered ingredients to the baking composition and intimately mixed therewith; the polyvinyl alcohol has a degree of polymerization of over 1000, preferably over 1600 and in particular over 2000. To form a homogeneous suspension, water is added to the dry mixture in a quantity of 100 to 300% by weight, preferably 100 to 240% by weight, relative to starch product.

In another variant of the method of the invention, 0.5 to 40% by weight of polyvinyl alcohol in the form of an aqueous solution, preferably at maximum a 10% solution, is added to the baking composition; the polyvinyl alcohol has a degree of polymerization of over 1000, preferably over 1600 and in particular over 2000; and to form a homogeneous suspension, water is added to the dry mixture in a quantity of 100 to 360% by weight, preferably 100 to 240% by weight, relative to starch product.

Polyvinyl alcohol is produced by the polymerization of vinyl acetate and subsequent partial or complete saponification of the acetate groups.

General formula:

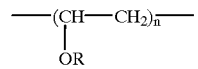

n=approximately 200–5500, mostly 300–2500

R=H:>97.5% fully saponified≦95.5 to 70% largely or partially saponified.

Polymers with a low residual acetyl content (down to approximately 2%) are classified as being fully saponified, and grades that are largely saponified (90 to 95%) and partly saponified (87 to 89%) are also commercially available. Individual manufacturers also offer a "super"-hydrolyzed grade, with a degree of saponification near 100%.

Toxicologically, no negative findings have been made. Polyvinyl alcohol is degradable; aqueous solutions should therefore require preservation.

The standard grades of polyvinyl alcohol can be classified by their viscosity (mpas in 4% aqueous solution), which goes along in parallel with the degree of polymerization (DP) and the mean molecular weight (number average) (source: TAPPI J., December 1988):

| Viscosity class | mPas, 4% | DP | Molecular weight, number average |
|---|---|---|---|
| high | 45–70 | 2400–2600 | 95,000 |
| medium I | 25–35 | 1700–1800 | 65,000 |
| medium II | 12–16 | 900–1000 | 43,000 |
| low | 2–7 | 300–700 | 28,000 |

In the method of the invention, especially preferably, a fully-hydrolyzed polyvinyl alcohol is used.

It has proved to be advantageous that the suspension formed is left to rest before being applied to the mold, the resting time of the baking composition being preferably at least 30 minutes and preferably 45 to 60 minutes.

In the method of the invention, the following are preferred as the release agent: stearates of magnesium, calcium or aluminum, in a quantity of 0.05 to 20% by weight, relative to starch product, but at least 10%, relative to the concentration of polyvinyl alcohol; polymethyl hydrogen siloxanes in a quantity of 0.025 to 11% by weight, relative to starch product, but at least 5% by weight, referred to the concentration of polyvinyl alcohol; and monostearyl citrate in a quantity of 0.025 to 12% by weight, relative to starch product, but at least 5% by weight, referred to the concentration of polyvinyl alcohol are used, on the condition that at concentrations above 0.5% by weight, an at least partial neutralization is done with basic substances in solution or powder form, such as sodium hydroxide solution, potassium hydroxide solution, ammonia solution, water glass and calcium hydroxide, so that the pH value of the baking compositions does not drop below 5.0 and preferably not below 6.0.

The aforementioned release agents can also be used in arbitrary combination, wherein the total concentration does not drop below the lowest individual concentration and does not exceed the highest individual concentration.

The combination of polymethyl hydrogen siloxanes and monostearyl citrate is highly preferred.

Chemically, the monostearyl citrate (MSC), according to its manufacturers, is a mixture of monostearyl and distearyl citrate esters, which show action as oil-soluble chelating agents. The long fatty acid residues lend them their oil solubility, and the free carboxyl groups lend them the complexing action.

The CAS number is 1337-33-3.; the melting point is 47° C. and the solubility in oils is approximately 1% by weight.

The product used was procured from Reilly Chemicals, Brussels, Belgium, and then ground. The manufacturer is Morflex, Inc., Greensboro, N.C., USA.

21 C.F.R. (Volume 21, Code of Federal Regulations) lists the following FDA-approved uses for stearyl citrates:

GRAS as complexing agents up to 0.15% (§182.685)

Use as plasticizer in packaging materials for foodstuffs (§181.27)

As plasticizer for resin-like and polymer coatings (§175.300)

Components for paper and cardboard in contact with aqueous or fatty foodstuffs (§176.170).

Besides the zirconium compounds recited at the outset, compounds such as calcium hydroxide and calcium sulfate, which by ionic action modify the starch products during the baking process, can also be used for the sake of better cross-linking. As a result of all these provisions, a strengthening of the structure of the baked molded articles is obtained.

With the above-noted and other objects in view, there is also provided, in accordance with the invention, an article of manufacture shaped from a thin-walled material comprising starch and polyvinyl alcohol, wherein the material is characterized by a phase gradient between opposing surfaces of the thin-walled material, such that the starch and polyvinyl alcohol near the surfaces is biphasic with at least some of the starch characterized as substantially intact granules occupying a discontinuous phase and such that substantially all the starch near the center of the material between the surfaces is characterized by at least partially disrupted granules that are more highly interspersed with the polyvinyl alcohol relative to the starch near the surfaces.

In accordance with yet a further feature of the invention, the polyvinyl alcohol is present in an amount of 0.5 to 40% by weight of the starch.

In accordance with yet another feature of the invention, the polyvinyl alcohol and the starch are crosslinked.

In accordance with yet an added feature of the invention, the material comprises a moisture content in the range of about 7–12% by weight.

In accordance with a concomitant feature of the invention the article of manufacture includes an effective amount of a release agent.

Other features which are considered as characteristic for the invention are set forth in the appended claims.

Although the invention is exemplified and described herein as embodied in a method for producing disposable thin-walled molded articles, it is nevertheless not intended to be limited to the examples described, since various modifications and structural changes may be made therein without departing from the spirit of the invention and within the scope and range of equivalents of the claims.

The method of operation of the invention, however, together with additional objects and advantages thereof will be best understood from the following description of specific embodiments and individual recipes.

DETAILED DESCRIPTION OF THE PREFERRED EMBODIMENTS

The figures in the recipes each refer to 100 parts by weight of raw starch material with its natural water content. The solutions of polyvinyl alcohol were prepared while stirring and heating in deionized water (polyvinyl alcohol solution). Powdered raw materials are stirred in premixed form into the liquid ingredient.

The baking temperature is approximately 190° C.

Water absorption test: A molded article equilibrated for 45% relative humidity for seven days is filled with 100 ml of deionized water. After 25 minutes, the water is poured off and the increase in weight is determined in grams.

The mechanical strength tests are performed with an Instron universal testing machine. A pressure cylinder 35 mm in diameter is first moved from above to the molded article, which rests on a metal ring with an inside diameter of 80 mm; then at a feeding speed of 30 mm/min, a load and travel graph is recorded. From this, the load until break, the elongation until break, the deformation work and the modulus of elasticity can be calculated.

| Recipe No. | 1 | 2 | 3 | 4 | 5 | 6 |
| --- | --- | --- | --- | --- | --- | --- |
| Baking mold: cup | | | | | | |
| Starch(1) | 100 | 100 | 100 | 100 | 100 | 100 |
| PVAL solid | — | 9.5(4) | 10(4) | 9.5(4) | 10(5) | 10.5(6) |
| Release agent(2) | 2 | 1.9 | 2 | 1.9 | 2 | 2.1 |
| Thickening agent(3) | 0.6 | 0.6 | 0.6 | 0.3 | 0.6 | 0.3 |
| Water | 100 | 114 | 110 | 114 | 110 | 126 |

-continued

| Recipe No. | 1 | 2 | 3 | 4 | 5 | 6 |
|---|---|---|---|---|---|---|
| Release agent | — | — | — | — | — | — |
| Viscosity after 60 min. | 0.7 | 2.5 | 2.3 | 0.7 | 7.0 | 1.9 |
| Baking time (sec) | 50 | 45 | 50 | 50 | 50 | 45 |
| Baking temp. (° C.) | 180 | 180 | 180 | 180 | 180 | 180 |
| Weight (g) | 4.2 | 7.2 | 7.2 | 6.5 | 5.7 | 5.1 |
| Brittleness | yes | red. | red. | Red. | red. | red. |
| Adhesion | no | yes | yes | yes | case-wise | no |
| Baking residues | no | yes | yes | yes | no | no |
| Discoloration | no | yes | yes | yes | no | no |
| Comments | comparison | unsuitable | unsuitable | unsuitable | deteriorated | |

(1) Potato starch
(2) Magnesium stearate
(3) Guar
(4) Poval B-05, Denka, Japan, low molecular - DP approximately 550, partly hydrolyzed
(5) Poval B-24, Denka, Japan, high molecular - DP approximately 1700, partly hydrolyzed
(6) Poval K17L, Denka, Japan, high molecular - DP approximately 2400, fully hydrolyzed

| Recipe No. | 7 | 8 | 9 | 10 | 11 | 12 |
|---|---|---|---|---|---|---|
| Baking mold: cup | | | | | | |
| Starch(1) | 100 | 100 | 100 | 100 | 100 | 100 |
| PVAL solid(4) | — | 0.5 | 2 | 5 | 10 | 20 |
| Release agent(2) | 2 | 2 | 2 | 2 | 3 | 4 |
| Thickening agent(3) | 0.3 | 0.3 | 0.3 | 0.3 | 0.3 | 0.3 |
| Water | 100 | 100 | 103 | 107 | 115 | 132 |
| Viscosity after 60 minutes | | | | | | |
| Baking time (sec) | 50 | 50 | 45 | 45 | 45 | 45 |
| Baking temp. (° C.) | 180 | 180 | 180 | 180 | 180 | 180 |
| Weight (g) | 4.3 | 4.5 | 4.7 | 5.0 | 5.2 | 5.1 |
| Brittleness | yes | +/− | red. | red. | red. | red. |
| Adhesion | no | no | no | no | no | no |
| Baking residues | no | no | no | no | no | no |
| Discoloration | no | no | no | no | no | no |
| Comments | comparison | (5) | | | | |

(1) Potato starch
(2) Magnesium stearate
(3) Guar
(4) Poval K17L, Denka, Japan, high molecular - DP approximately 2400, fully hydrolyzed
(5) Brittleness reduced slightly

| Recipe No. | 13 | 14 | 15 | 16 | 17 | 18 |
|---|---|---|---|---|---|---|
| Baking mold: plate | | | | | | |
| Starch(1) | 100 | 100 | 100 | 100 | 100 | 100 |
| PVAL solution 10% | — | 25(4) | 25(4) | 50(4) | 100(4) | 50(5) |
| Release agent(2) | 1.8 | 1.8 | 1.8 | 1.9 | 2.1 | 2 |
| Thickening agent(3) | 0.5 | 0.6 | — | — | — | — |
| Water | 100 | 75 | 75 | 50 | 6.7 | 110 |
| Filler(6) | — | — | — | — | — | 10 |
| Baking time (sec) | 120 | 120 | 145 | 120 | 130 | 140 |
| Baking temp. (° C.) | 200 | 200 | 200 | 200 | 200 | 200 |
| Weight (g) | 14 | 14.5 | 16 | 17 | 17.5 | 22 |
| Brittleness | yes | red. | red. | red. | red. | red. |
| Adhesion | no | no | no | no | no | partly |
| Baking residues | no | no | no | no | no | yes |
| Discoloration | no | no | no | no | no | no |
| Comments | comparison | | | | | deteriorated |

-continued

| Recipe No. | 13 | 14 | 15 | 16 | 17 | 18 |
|---|---|---|---|---|---|---|

(1) Potato starch
(2) Magnesium stearate
(3) Guar
(4) Airvol 525, Air Products, USA, >98% hydrolyzed, DP approximately 1600
(5) Mowiol 10–98, Hoechst, Germany, >98% hydrolyzed, DP approximately 1000
(6) SE-Standard, Naintsch, Austria

| Recipe No. | 19 | 20 | 21 | 22 | 23 |
|---|---|---|---|---|---|
| Baking mold: plate | | | | | |
| Starch(1) | 100 | 100 | 100 | 100 | 100 |
| PVAL solution 10% W/W | — | 25(4) | 50(4) | 100(4) | 217(5) |
| Release agent(2) | 1.8 | 1.8 | 1.8 | 1.8 | 2.17 |
| Thickening agent(3) | 0.55 | 0.25 | — | — | — |
| Water | 103 | 75 | 55 | 0 | — |
| Sodium hydroxide 40 g/l | — | — | 1 | 1 | 1.1 |
| Baking time (sec) | 130 | 115 | 105 | 115 | 100 |
| Baking temp. (° C.) | 200 | 200 | 200 | 200 | 200 |
| Weight (g) | 23.5 | 22.5 | 20 | 18.5 | 12 |
| Brittleness | yes | red. | red. | red. | red. |
| Adhesion | no | no | no | no | partly |
| Baking residues | no | no | no | no | no |
| Discoloration | no | no | no | no | no |
| Comments | comparison | | | | deteriorated |

(1) Cornstarch
(2) Magnesium stearate
(3) Guar
(4) Airvol 325, Air Products, USA; 98% hydrolyzed, DP approximately 1600
(5) Airvol 350, Air Products, USA; 98% hydrolyzed, DP approximately 2400

| Recipe No. | 24 | 25 | 26 | 27 | 28 |
|---|---|---|---|---|---|
| Baking mold: plate | | | | | |
| Starch(1) | 100 | 100 | 100 | 100 | 100 |
| PVAL solution 10% W/W | 217(4) | 97(4) | 50(5) | 100(5) | 217(5) |
| Release agent(2) | 2.17 | 1.93 | 1.8 | 1.8 | 2.17 |
| Thickening agent(3) | — | — | — | — | — |
| Water | 43.5 | 48.5 | 50 | 20 | — |
| Sodium hydroxide 40 g/l | 1.1 | 1 | 1 | 1 | 1.1 |
| Viscosity after 60 minutes | 600 | 600 | 800 | 500 | 130 |
| Baking time (sec) | 90 | 100 | 120 | 110 | 115 |
| Baking temp. (° C.) | 200 | 200 | 180 | 180 | 180 |

-continued

| Recipe No. | 24 | 25 | 26 | 27 | 28 |
|---|---|---|---|---|---|
| Weight (g) | 9.5 | 15 | 21 | 19 | 12 |
| Brittleness | red. | red. | red. | red. | red. |
| Adhesion | no | no | no | partly | yes |
| Baking residues | no | no | yes | yes | yes |
| Discoloration | no | no | no | no | no |
| Comments | | | deteriorated | deteriorated | deteriorated |

(1) Cornstarch
(2) Magnesium stearate
(3) Guar
(4) Airvol 350, Air Products, USA; 98% hydrolyzed, DP approximately 2400
(5) Airvol 523, Air Products, USA; 88% hydrolyzed, DP approxinately 1600

| Recipe No. | 29 | 30 | 31 |
|---|---|---|---|
| Baking mold: plate | | | |
| Starch(1) | 100 | 100 | 100 |
| PVAL solution 10% W/W | 50(4) | 100(4) | 100(4) |
| Release agent(2) | 1.8 | 1.8 | 2.0 |
| Thickening agent(3) | — | — | — |
| Water | 50 | 20 | — |
| Baking time(sec) | 120 | 120 | 115 |
| Baking temperature (° C.) | 200 | 200 | 180 |
| Weight (g) | 16.5 | 16 | 12 |
| Brittleness | red. | red. | red. |
| Adhesion | partly | partly | partly |
| Baking residues | yes | yes | yes |
| Discoloration | no | no | no |
| Comments | deteriorated | deteriorated | deteriorated |

(1) Potato starch
(2) Magnesium stearate
(3) Guar
(4) Airvol 523, Air Products, USA; 88% hydrolyzed, DP >2400

| Recipe No. | 32 | 33 | 34 | 35 | 36 |
|---|---|---|---|---|---|
| Baking mold: fast-food shell with hinge | | | | | |
| Starch(1) | 100 | 100 | 100 | 100 | 100 |
| PVAL solution 10% W/W | — | 210(5) | 158(5) | 105(5) | 105(5) |
| Release agent(2) | 1.8 | 3.4 | 3.4 | 3 | 3 |
| Thickening | 0.5 | — | — | — | — |

| Recipe No. | 32 | 33 | 34 | 35 | 36 |
|---|---|---|---|---|---|
| agent(3) | | | | | |
| Fibrous material(4) | — | — | 2 | 4 | 6 |
| Water | 100 | — | 25 | 65 | 75 |
| Weight (g) | 21.3 | 19.2 | 18.9 | 18.6 | 18.0 |
| Brittleness | yes | red. | red. | red. | red. |
| Adhesion | no | partly | no | no | no |
| Baking residues | no | no | no | no | no |
| Discoloration | no | no | no | no | no |
| Comments | comparison; hinge breaks | hinge works | hinge works | hinge works | hinge works |

(1) Potato starch
(2) Magnesium stearate
(3) Guar
(4) Cellulose fiber
(5) Mowiol 66–100, Hoechst, "super"-hydrolyzed, high molecular

| Recipe No. | 43 | 44 | 45 | 46 | 47 |
|---|---|---|---|---|---|
| agent(3) | | | | | |
| Filler(7) | — | — | — | — | 3 |
| Water | 160 | 126 | 130 | 100 | 108 |
| Weight (g) | 4.9 | 4.9 | 4.9 | 4.2 | 4.1 |
| Brittleness | red. | red. | red. | red. | Red. |
| Adhesion | no | no | no | no | no |
| Baking residues | partly | slight | no | partly | partly |
| Discoloration | no | no | no | no | no |
| Comments | deteriorated | deteriorated | | deteriorated | deteriorated |

(1) Potato starch
(2) Magnesium stearate
(3) Guar
(4) Airvol 523-S, Air Products, USA; 88% hydrolyzed, DP approximately 1600
(5) Fluka, PVAL, molecular weight 100,000, 86–89% hydrolyzed
(6) Fluka, PVAL, molecular weight 72,000, 97.5–99.5% hydrolyzed
(7) Ulmer Weiß HMH

| Recipe No. | 37 | 38 | 39 | 40 | 41 | 42 |
|---|---|---|---|---|---|---|
| Baking mold: cup | | | | | | |
| Starch(1) | 100 | 100 | 100 | 100 | 100 | 100 |
| PVAL powder | 10(4) | 10(4) | 7(5) | — | — | 10(4) |
| PVAL solution 10% | — | — | — | 110(6) | 110(6) | — |
| Release agent(2) | 3 | 3 | 3 | 3 | 3 | 3 |
| Thickening agent(3) | — | — | 0.6 | — | — | — |
| Glycerin, 87% | — | 5 | — | — | 5 | — |
| Wheat fiber | — | — | — | — | — | 5 |
| Water | 115 | 115 | 115 | 32 | 32 | 158 |
| Weight (g) | 5.7 | 6.8 | 6.3 | 4.9 | — | 4.9 |
| Baking time (sec) | 40 | 45 | 32 | 40 | 45 | 35 |
| Brittleness | red. | red. | Red. | red. | red. | red. |
| Adhesion | no | no | partly | no | no | no |
| Baking residues | no | no | no | partly | partly | no |
| Discoloration | no | no | no | no | no | no |
| Comments | | more flexible than 38! | | | poor unmolding | |

(1) Potato starch
(2) Magnesium stearate
(3) Guar
(4) Airvol 523-S, Air Products, USA; 88% hydrolyzed, DP approximately 1600
(5) Poval K17, Denka, Japan, high molecular, fully hydrolyzed
(6) Fluka, molecular weight 72,000, fully hydrolyzed

| Recipe No. | 43 | 44 | 45 | 46 | 47 |
|---|---|---|---|---|---|
| Baking mold: cup | | | | | |
| Starch(1) | 100 | 100 | 100 | 100 | 100 |
| PVAL powder | 15(4) | 15(5) | 15(6) | 5(4) | 5(4) |
| Release agent(2) | 3 | 3 | 3 | 3 | 3 |
| Thickening | — | — | — | 0.3 | 0.3 |

| Recipe No. | 48 | 49 | 50 | 51 | 52 |
|---|---|---|---|---|---|
| Baking mold: fast-food shell with hinge | | | | | |
| Starch(1) | 100 | 100 | 100 | 100 | 100 |
| PVAL | 8(5) | 21(6) | 15(6) | 10(6) | 10(7) |
| Release | 3 | 3.5 | 3 | 3 | 3 |

-continued

| Recipe No. | 48 | 49 | 50 | 51 | 52 |
|---|---|---|---|---|---|
| agent(2) | | | | | |
| Thickening agent(3) | 0.1 | — | — | 0.3 | 0.3 |
| Fibrous material(4) | — | — | 5 | 5 | 3 |
| Water | 125 | 185 | 150 | 135 | 115 |
| Brittleness | red. | red. | red. | red. | red. |
| Adhesion | no | no | no | no | no |
| Baking residues | no | no | no | no | no |
| Discoloration | no | no | no | no | no |
| Comments | hinge works | hinge works | hinge works | hinge works | hinge works |

(1)Potato starch
(2)Magnesium stearate
(3)Guar
(4)Cellulose fiber
(5)Fluka, PVAL, molecular weight 72,000, fully hydrolyzed
(6)Mowiol 66–100, Hoechst, "super"-hydrolyzed, high molecular, ground
(7)Airvol 523-S, Air Products, USA; 88% hydrolyzed, DP approximately 1600

| Recipe No. | 53 | 54 | 55 | 56 | 57 |
|---|---|---|---|---|---|
| Baking mold: cup | | | | | |
| Starch(1) | 100 | 100 | 100 | 100 | 100 |
| PVAL powder | 7(5) | 10(6) | 10(7) | 10(7) | 10(7) |
| Release agent(2) | 3 | 3 | 3 | 3 | 3 |
| Thickening agent(3) | 0.6 | — | — | — | — |
| Wheat fiber(4) | — | — | — | 4 | 6 |
| Water | 11 | 125 | 130 | 145 | 150 |
| Weight (g) | 5.7 | 5.2 | 4.9 | 4.6 | 4.5 |
| Baking time (sec) | 40 | 40 | 40 | 40 | 40 |
| Brittleness | red. | red. | red. | red. | Red. |
| Adhesion | no | no | no | no | no |
| Baking residues | no | no | no | no | no |
| Discoloration | no | no | no | no | no |

(1)Potato starch/Biolys 3/1
Biolys = modified starch, Lyckeby Stärkelsen, Sweden
(2)Magnesium stearate
(3)Guar

| Recipe No. | 53 | 54 | 55 | 56 | 57 |
|---|---|---|---|---|---|

(4)Vitacel WF 600, Rettenmaier, Germany
(5)Poval K17, Denka, Japan, DP approximately 1700, fully hydrolyzed
(6)Airvol 165, Air Products, "super"-hydrolyzed, high molecular, ground
(7)Airvol 523-S, Air Products, USA; 88% hydrolyzed, DP approximately 1600

| Recipe No. | 58 | 59 | 60 | 61 | 62 | 63 |
|---|---|---|---|---|---|---|
| Baking mold: plate | 1 | 2 | 3 | 4 | 5 | 10 |
| Potato starch | 100 | 100 | 100 | 100 | 100 | 100 |
| PVAL solution, 10%,(1) | 0 | 0 | 89.7 | 89.7 | 201.7 | 377.6 |
| Release agent(2) | 1.8 | 1.8 | 2 | 2 | 2.4 | 4 |
| Thickening agent(3) | 0.5 | 0.7 | 0 | 0 | 0 | 0 |
| Water | 100 | 143 | 44.8 | 78.9 | 0 | 0 |
| Viscosity, Pa/s | 6.5 | 1.5 | 35 | 4.5 | 45 | 58 |
| Weight (g) | 16.3 | 11.4 | 13.7 | 10.8 | 10.4 | 10.5 |
| Baking time (sec) | 130 | 120 | 130 | 115 | 130 | 95 |
| Water absorption | — | 13 | 10.6 | 8.7 | 8 | 10.5 |
| Adhesion | no | no | no | partly | no | no |
| Baking residues | no | no | no | yes | no | no |
| Discoloration | no | no | no | no | no | no |

(1)Airvol 350, >98% hydrolyzed, DP approximately 2400
(2)Magnesium stearate
(3)Guar

| | | | | | | |
|---|---|---|---|---|---|---|
| Load until break, N; 45% rF | 97 | 77 | 148 | 95 | 120 | 116 |
| Load per g of weight | 6 | 6.8 | 10.8 | 8.8 | 11.5 | 11 |
| Relative to recipe No. 58 | 100 | 114 | 182 | 148 | 184 | 186 |
| Elongation to break; 45% rF | 5.1 | 6.2 | 7.7 | 8.3 | 13.4 | 11.4 |
| Relative to recipe No. 58 | 100 | 122 | 151 | 163 | 263 | 224 |

| | Recipe No. | | | | | |
|---|---|---|---|---|---|---|
| | 64 | 65 | 66 | 67 | 68 | 69 |
| Baking mold: plate | 25 | 26 | 27 | 33 | 35 | 38 |
| Potato starch | 100 | 100 | 100 | 100 | 100 | 100 |
| PVAL solution, 10% | 89.7(1) | 93.8(1) | 201.7(1) | 89.7(2) | 201.7(2) | 205.5(3) |
| Release agent(4) | 2 | 2.1 | 2.4 | 2 | 2.4 | 2.1 |
| Water | 26.9 | 82.6 | 0 | 39 | 0 | 0 |
| Viscosity, Pa/s | 16 | 1.2 | 12 | 16 | 40 | 9 |
| Weight (g) | 17.3 | 11.1 | 13.1 | 15.6 | 12.4 | 12.6 |
| Baking time (sec) | 150 | 120 | 150 | 140 | 130 | 130 |
| Water absorption | 10.2 | 8 | 9.8 | 18.4 | 16.8 | 18.5 |

-continued

|  | Recipe No. | | | | | |
| --- | --- | --- | --- | --- | --- | --- |
|  | 64 | 65 | 66 | 67 | 68 | 69 |
| Adhesion | no | yes | no | no | no | no |
| Baking residues | no | no | no | no | no | no |
| Discoloration | no | no | no | no | no | no |

(1) Airvol 325, >98% hydrolyzed, DP approximately 1600
(2) Airvol 540, 88% hydrolyzed, DP approximately 2000
(3) Airvol 523, 88% hydrolyzed, DP approximately 1600
(4) Magnesium stearate

| | | | | | | |
| --- | --- | --- | --- | --- | --- | --- |
| Load until break, N; 45% rF | 210 | 88 | 150 | 139 | 126 | 149 |
| Load per g of weight | 12.1 | 7.9 | 11.5 | 8.9 | 10.2 | 11.8 |
| Relative to recipe No. 58 | 203 | 133 | 193 | 150 | 171 | 198 |
| Elongation to break; 45% rF | 8.1 | 6.3 | 8.2 | 7.9 | 8.9 | 8.7 |
| Relative to recipe No. 58 | 159 | 124 | 161 | 155 | 175 | 171 |

|  | Recipe No. | | | | |
| --- | --- | --- | --- | --- | --- |
|  | 70 | 71 | 72 | 73 | 74 |
| Baking mold: plate | 40 | 41 | 42 | 48 | 49 |
| Cornstarch | 100 | 100 | 100 | 100(2) | 100(2) |
| PVAL solution, 10%,(1) | 0 | 98.9 | 222 | 0 | 205 |
| Release agent(3) | 2.6 | 2.6 | 3.6 | 2 | 2.4 |
| Thickening agent(4) | 1.6 | 0 | 0 | 1 | 0 |
| Water | 185.7 | 98.9 | 11.1 | 148.5 | 5.7 |
| Viscosity, Pa/s | 9.8 | 2 | 43 | 6 | 56 |
| Weight (g) | 16 | 14.5 | 13.7 | 8.4 | 8.5 |
| Baking time (sec) | 115 | 120 | 110 | 75 | 80 |
| Water absorption | 12 | 12.8 | 10.4 | — | 7.5 |
| Adhesion | no | yes | no | no | no |
| Baking residues | no | yes | no | no | no |
| Discoloration | no | no | no | no | no |

(1) Airvol 350, >98% hydrolyzed, DP approximately 2400
(2) Wax cornstarch
(3) Magnesium stearate
(4) Guar

| | | | | | |
| --- | --- | --- | --- | --- | --- |
| Load until break, N; 45% rF | 88 | 81 | 106 | 32 | 70 |
| Load per g of weight | 5.5 | 5.6 | 7.7 | 3.8 | 8.2 |
| Relative to recipe No. 58 | 92 | 94 | 130 | 64 | 138 |
| Elongation to break; 45% rF | 3.8 | 5 | 4.9 | 4.9 | 6.7 |
| Relative to recipe No. 58 | 75 | 98 | 96 | 96 | 131 |

|  | Recipe No. | | | | |
| --- | --- | --- | --- | --- | --- |
|  | 75 | 76 | 77 | 78 | 79 |
| Baking mold: plate | 43 | 44 | 45 | 46 | 47 |
| Cornstarch | 100 | 100 | 100 | 100 | 100 |
| PVAL solution, 10% | 0 | 0 | 222(1) | 223(1) | 223(2) |
| Release agent(3) | 2.4 | 2.4 | 3.3 | 3 | 3 |
| Thickening agent(4) | 1.6 | 1.6 | 0 | 0 | 0 |
| Water | 173.3 | 173.3 | 11 | 11.3 | 11.3 |
| Calcium hydroxide, powdered | 0.22 | 0.88 | 0.28 | 0.59 | 0.27 |
| Hydrogen peroxide, 30% | 0 | 0 | 0 | 0.74 | 3.56 |
| Viscosity, Pa/s | 12 | 13 | 64 | 67 | 8.5 |

-continued

|  | Recipe No. | | | | |
| --- | --- | --- | --- | --- | --- |
|  | 75 | 76 | 77 | 78 | 79 |
| Weight (g) | 15.3 | 15.1 | 13.4 | 12 | 10.7 |
| Baking time (sec) | 120 | 120 | 120 | 95 | 85 |
| Water absorption | 9.7 | 8 | 5.9 | 5.8 | 13 |
| Adhesion | no | no | no | no | no |
| Baking residues | no | yes | yes | yes | no |
| Discoloration | no | no | no | no | no |

(1) Airvol 350, >98% hydrolyzed, DP approximately 2400
(2) Airvol 325, >98% hydrolyzed, DP approximately 1600
(3) Magnesium stearate
(4) Guar

| | | | | | |
| --- | --- | --- | --- | --- | --- |
| Load until break, N; 45% rF | 95 | 75 | 106 | 73 | 68 |
| Load per g of weight | 6.2 | 5 | 7.9 | 6.1 | 6.4 |
| Relative to recipe No. 58 | 104 | 83 | 133 | 102 | 107 |
| Elongation to break; 45% rF | 4.4 | 3.7 | 4.4 | 4.3 | 5.5 |
| Relative to recipe No. 58 | 86 | 73 | 86 | 84 | 108 |

| Recipe No. | 80 | 81 | 82 | 83 | 84 | 85 |
| --- | --- | --- | --- | --- | --- | --- |
| Baking mold: plate | 17 | 18 | 19 | 20 | 21 | 22 |
| Potato starch | 100 | 100 | 100 | 100 | 100 | 100 |
| PVAL solution, 10%(1) | 0 | 211 | 211 | 0 | 211 | 0 |
| Release agent(2) | 2.1 | 2.2 | 0 | 2.2 | 2.2 | 2.2 |
| Thickening agent(3) | 1.5 | 0 | 0 | 1.5 | 0 | 0 |
| Water | 152 | 0 | 0 | 152 | 0 | 152 |
| Calcium hydroxide, powdered | 0.42 | 0.51 | 0.51 | 0 | 0 | 0 |
| Calcium sulfate, powdered | 0 | 0 | 0 | 0.43 | 0.51 | 0 |
| Cross-linking agent(4) | 0 | 0 | 0 | 0 | 0 | 1.27* |
| Viscosity, Pa/s | — | 120 | 170 | 7.4 | 120 | — |
| Weight (g) | 17.8 | 13.6 | 16.4 | 11.4 | 10 | 23.6 |
| Baking time (sec) | 160 | 150 | 135 | 130 | 130 | 175 |
| Water absorption | 11 | 4.4 | 6.6 | 10.6 | 6.1 | 13.4 |
| Adhesion | no | no | yes | no | no | no |
| Baking residues | yes | yes | yes | no | no | yes |
| Discoloration | no | no | no | no | no | no |

(1) Airvol 350, >98% hydrolyzed, DP approximately 2400
(2) Magnesium stearate
(3) Guar
(4) Ammonium zirconium carbonate (Bacote 20)
*Adjustment of pH to 9.5 with 1N KOH before the addition

|  |  |  |  |  |  |  |
|---|---|---|---|---|---|---|
| Load until break, N; 45% rF | 88 | 172 | 170 | 65 | 129 | 116 |
| Load per g of weight | 4.9 | 12.6 | 10.4 | 5.7 | 12.9 | 4.9 |
| Relative to recipe No. 58 | 83 | 213 | 174 | 96 | 217 | 83 |
| Elongation to break; 45% rF | 4.5 | 7.8 | — | 5.1 | 7.8 | 5 |
| Relative to recipe No. 58 | 88 | 153 | — | 100 | 153 | 98 |

|  | Recipe No. | | | | |
|---|---|---|---|---|---|
|  | 86 | 87 | 88 | 89 | 90 |
| Baking mold: plate | 23 | 24 | 28 | 29 | 30 |
| Potato starch | 100 | 100 | 100 | 100 | 100 |
| PVAL solution, 10% | 215(1) | 215(1) | 223(2) | 223(2) | 222(2) |
| Release agent(3) | 2 | 2 | 1.9 | 1.9 | 1.9 |
| Water | 0 | 0 | 4.5 | 0 | 0 |
| Cross-linking agent | 1.27(4)* | 2.54(4)* | 1.59(4)* | 1.59(5)# | 3.17(5)# |
| Viscosity, Pa/s | 192 | >200 | 53 | 19 | 31 |
| Weight (g) | 15.3 | 20.8 | 18.7 | 14.8 | 17.1 |
| Baking time (sec) | 120 | 180 | 140 | 130 | 130 |
| Water absorption | 8.5 | 6 | 7.9 | 3.8 | 3.9 |
| Adhesion | no | yes | no | — | no |
| Baking residues | no | yes | no | — | no |
| Discoloration | no | no | no | no | no |

(1)Airvol 350, >98% hydrolyzed, DP approximately 2400
(2)Airvol 325, >98% hydrolyzed, DP approximately 1600
(3)Magnesium stearate
(4)Ammonium zirconium carbonate (Bacote 20)
*Adjustment of pH to 9.5 with 1N KOH before addition
**Adjustment of pH to 9.4 with 1M ammonia before addition
(5)Zirconium acetate solution (22% ZrO2)
Adjustment of pH to 4.7 with 1N acetic acid before addition

|  |  |  |  |  |  |
|---|---|---|---|---|---|
| Load until break, N; 45% rF | 113 | 267 | 204 | 158 | 174 |
| Load per g of weight | 7.4 | 12.8 | 10.9 | 10.7 | 10.2 |
| Relative to recipe No. 58 | 124 | 216 | 183 | 179 | 171 |
| Elongation to break; 45% rF | 3.7 | 8.4 | 6 | 5.1 | 5.2 |
| Relative to recipe No. 58 | 73 | 165 | 118 | 100 | 102 |

|  | Recipe No. | | | | |
|---|---|---|---|---|---|
|  | 91 | 92 | 93 | 94 | 95 |
| Baking mold: plate | 7 | 8 | 31 | 32 | 666 |
| Potato starch | 100 | 100 | 100 | 100 | 100 |
| PVAL solution, 10% | 221(1) | 220(1) | 225(2) | 221(2) | 0 |
| Release agent | 2.2(3) | 2.2(4) | 1.9(4) | 2.3(4) | 1(3) + 1(4) |
| Thickening agent(5) | 0 | 0 | 0 | 0 | 0.5 |
| Water | 159 | 159 | 9 | 0 | 110 |
| Viscosity, Pa/s | 3.3 | 1.3 | 31 | 19 | 39 |
| Weight (g) | 7.3 | 9 | 18.2 | 20.2 | 18 |
| Baking time (sec) | 85 | 95 | 140 | 135 | 100 |
| Water absorption | 14.2 | 5.5 | 5.7 | 5.9 | — |
| Adhesion | yes | no | no | no | no |
| Baking residues | yes | no | no | no | no |
| Discoloration | no | no | no | no | no |

(1)Airvol 350, >98% hydrolyzed, DP approximately 2400
(2)Airvol 325, >98% hydrolyzed, DP approximately 1600
(3)Magnesium stearate
(4)Monostearyl citrate
(5)Xanthan

|  |  |  |  |  |  |
|---|---|---|---|---|---|
| Load until break, N; 45% rF | 64 | 81 | 200 | 146 | — |
| Load per g of weight | 8.8 | 9 | 11 | 7.2 | — |
| Relative to recipe No. 58 | 147 | 151 | 185 | 121 | — |
| Elongation to break; 45% rF | 7.5 | 7.2 | 5.4 | 3.5 | — |
| Relative to recipe No. 58 | 147 | 141 | 106 | 69 | — |

| | Recipe No. | | | | | |
|---|---|---|---|---|---|---|
| | 96 | 97 | 98 | 99 | 100 | 101 |
| Baking mold: plate | 65.1 | .2 | .3 | .4 | .5 | .6 |
| Potato starch | 100 | 100 | 100 | 100 | 100 | 100 |
| PVAL powder(1) | 0 | 0 | 10 | 10 | 10 | 10 |
| Release agent(2) | 2 | 2 | 3 | 3 | 3 | 3 |
| Release agent(3) | 0 | 0 | 1 | 1 | 1 | 1 |
| Thickening agent | 0.6(4) | 0.6(4) | 0 | 0 | 0.5(5) | 0.5(5) |
| Hydrogen peroxide, 30% | 0 | 0 | 0 | 5 | 0 | 4 |
| Calcium hydroxide, powdered | 0 | 0.5 | 0 | 0 | 0 | 0 |
| Water | 110 | 110 | 120 | 120 | 130 | 130 |
| Viscosity, Pa/s | 1.1 | 1.4 | 6 | 6 | 4.5 | 4.5 |
| Weight (g) | 17.5 | 23.4 | 19.6 | 17.1 | 17.1 | 14.1 |
| Baking time (sec) | 100 | 130 | 110 | 80 | 95 | 90 |
| Adhesion | no | no | no | no | no | no |
| Baking residues | no | no | no | no | no | no |
| Discoloration | no | slight | no | no | no | no |

(1) Airvol 523, 88% hydrolyzed, DP approximately 1600
(2) Magnesium stearate
(3) Polymethyl hydrogen siloxane NM203
(4) Guar
(5) Xanthan

| Recipe No. | 102 | 103 | 104 | 105 | 106 | 107 | 108 | 109 |
|---|---|---|---|---|---|---|---|---|
| Baking mold: plate | | | | | | | | |
| Starch | 100(1) | 100(1) | 100(2) | 100(2) | 100(3) | 100(3) | 100(4) | 100(4) |
| PVAL sol., 10% in water | 0 | 203(5) | 0 | 223(5) | 0 | 205(6) | 0 | 222(6) |
| Release agent(7) | 1.6 | 2 | 2 | 2.4 | 2 | 2.4 | 2 | 3.6 |
| Thickening agent(8) | 0.8 | 0 | 1 | 0 | 1 | 0 | 1 | 0 |
| Water* | 142 | 0 | 159 | 1.6 | 148 | 5.7 | 171 | 11.1 |
| Weight, (g), 50% rH** | 8.7 | 8.2 | 11.2 | 13 | 7.4 | 8.5 | 14 | 13.7 |
| Baking time (sec) | 85 | 85 | 110 | 120 | 75 | 80 | 110 | 110 |
| Baking temp. (° C.) | 200 | 200 | 200 | 200 | 205 | 205 | 205 | 205 |
| Adhesion | no | no | no | no | no | no | no | no |
| Baking residues | no | no | no | no | no | no | no | no |
| Discoloration | no | no | no | no | no | no | no | no |
| Load until break (N), 20% rH** | 18 | 51 | 38 | 49 | 14 | 35 | 42 | 70 |
| Elongation to break (mm), 20% rH** | 2.9 | 6.8 | 2.9 | 3.9 | 2.4 | 4 | 2.4 | 2.5 |
| Load until break (N), 50% rh** | 46 | 74 | 70 | 141 | 26 | 66 | 72 | 106 |
| Elongation to break (mm), 50% rh** | 6.6 | 11.5 | 6.3 | 9.1 | 5.2 | 6.6 | 4 | 5.6 |
| Load per g of weight, 50%** | 5.3 | 9 | 6.3 | 10.8 | 3.5 | 7.8 | 5.1 | 7.7 |

*33% total solids
**after 7 days equilibration
(1) Potato amylopectin (Lyckeby Stärkelsen, S)
(2) Potato starch (Avebe, NL)
(3) Waxy maize starch (Amioca, National Starch)
(4) Corn starch (Buffalo 3401, CPC International, USA)
(5) Airvol 325, >98% hydrolyzed, DP approximately 1600
(6) Airvol 350, >98% hydrolyzed, DP approximately 2400
(7) Magnesium stearate
(8) Guar gum

| Recipe No. | 110 | 111 | 112 | 113 | 114 | 115 | 116 | 117 |
|---|---|---|---|---|---|---|---|---|
| Baking mold: plate | | | | | | | | |
| Starch | 100(1) | 100(2) | 100(2) | 100(2) | 100(2) | 100(2) | 100(3) | 100(3) |
| PVAL solution, 10% in water | 0 | 0) | 101(4) | 0 | 169(4) | 225(4) | 0 | 230(5) |
| Release agent (6) | 2 | 1.8 | 4.1 | 2 | 4.3 | 4.5 | 2 | 2 |
| Thickening agent(7) | 1 | 0.6 | 0 | 1 | 0 | 0 | 1 | 0 |
| Water | 167 | 135 | 17.4 | 146 | 19.2 | 0 | 167 | 7.6 |
| % solids | 33 | 39 | 46 | 37 | 37 | 34 | 33 | 33 |
| Weight (g),50% rH** | 27.3 | 25.3 | 33.4 | 20 | 18.1 | 16.5 | 10.7 | 10.5 |
| Baking time (sec) | 180 | 110 | 110 | 95 | 90 | 110 | 80 | 80 |
| Baking temp. (° C.) | 205 | 200 | 210 | 205 | 210 | 210 | 205 | 205 |
| Product appearance | irregular | smooth | smooth | smooth | smooth | irregular | smooth | smooth |
| Adhesion | no | no | no | no | no | no | no | no |
| Baking residues | no | no | no | no | no | no | no | no |
| Discoloration | no | no | no | no | no | no | no | no |
| Load until break (N), 20% rH** | | 76 | 134 | 54 | 101 | 65 | 34 | 54 |
| Elongation to break(mm),20% rH** | | 2.1 | 2.6 | 2.7 | 3.7 | 4.4 | 2.7 | 3.4 |
| Load until break, (N), 50% rH** | | 125 | 292 | 126 | 161 | 148 | 59 | 86 |
| Elongation to break(mm),50% rH** | | 2.9 | 7.8 | 5.9 | 8.1 | 10.6 | 6.9 | 8.1 |
| Load per g of weight, 50%** | | 4.9 | 8.7 | 6.3 | 8.9 | 9 | 5.5 | 8.2 |

**after 7 days equilibration
(1) 50%-amylose corn starch (Amaizo 5, American Maize, USA)
(2) 50%-amylose corn starch derivate (Amaizo Crisp Tex, American Maize, USA)
(3) Corn starch derivate (Ethylex 2095, A.E. Staley, USA)
(4) Airvol 350, >98% hydrolyzed, DP approximately 2400
(5) Airvol 523, >88% hydrolyzed, DP approximately 1600
(6) Magnesium stearate
(7) Guar gum

| | Recipe No. | |
|---|---|---|
| | 118 | 119 |
| Baking mold: plate | | |
| Starch(1) | 100 | 100 |
| PVAL solution, 15% in water | 254(3) | 254(3) |
| Release agent(4) | 2.6 | 2.6 |
| Water | 21 | 21 |
| % PVAL relative to starch | 38 | 38 |
| % solids in batter | 33 | 33 |
| Weight (g), 50% rH** | 11.9 | 14.2 |
| Baking time (sec) | 130 | 125 |
| Baking temp. (° C.) | 200 | 200 |
| Adhesion | no | slight |
| Baking residues | no | slight |
| Discoloration | no | no |
| Load until break (N), 20% rH** | 73 | 117 |
| Elongation to break (mm), 20% rH** | 4.5 | 5.1 |
| Load until break (N), 50% rH** | 150 | 156 |
| Elongation to break (mm), 50% rH** | 9.8 | 9.4 |
| Load per g of weight, 50% rH** | 12.6 | 11.0 |

(1) Potato Starch (Avebe, NL)
(2) Airvol 325, >98% hydrolysed, DP approximately 1600
(3) Airvol 523, >88% hydrolysed, DP approximately 1600
**after 7 days equilibration

| | Recipe No. | | | | |
|---|---|---|---|---|---|
| | 120 | 121 | 122 | 123 | 124 |
| Baking mold: plate | | | | | |
| Starch(1) | 100 | 100 | 100 | 100 | 100 |
| PVAL-solution, 10% in water | 0 | 203(2) | 0 | 205(3) | 205(3) |
| Release agent(4) | 1.6 | 2.0 | 1.6 | 2.0 | 2.1 |

-continued

| | Recipe No. | | | | |
|---|---|---|---|---|---|
| | 120 | 121 | 122 | 123 | 124 |
| Thickening agent(5) | 0.8 | 0 | 0.8 | 0 | 0 |
| Aspen fiber(6) | 0 | 0 | 0 | 0 | 5 |
| Water | 142 | 0 | 141 | 0 | 16 |
| % solids | 33 | 33 | 33 | 33 | 33 |
| Tray weight (7 days, 50% rH) | 8.7 | 8.2 | 8.2 | 7.6 | 7.9 |
| Baking time (sec) | 85 | 85 | 80 | 85 | 80 |
| Adhesion | no | no | no | no | no |
| Baking residues | no | no | no | no | no |
| Discoloration | no | no | no | no | no |
| Load until break (N), 20% rH | 18 | 51 | 22 | 54 | 59 |
| Elongation to break (mm) 20% rH | 2.9 | 6.8 | 3.3 | 7.3 | 7.3 |
| Load until break (N), 50% rH | 46 | 74 | 42 | 54 | 56 |
| Elongation to break (mm) 50% rH | 6.6 | 11.5 | 7.1 | 10.1 | 7.3 |
| Load until break (N), 80% rH | | | 15 | 27 | 37 |
| Elongation to break (mm) 50% rH | | | 5.6 | 10.7 | 11.4 |
| Load until break (N), 85% rH | 9 | 29 | | | |
| Elongation to break (mm) 85% rH | 5.0 | 8.0 | | | |
| Load per g of weight 50% rH | 5.3 | 9.0 | 5.1 | 7.1 | 7.1 |

(1)Potato amylopectin (Lyckeby Stärkelsen, S)
(2)Airvol 325, >98% hydrolyzed, DP approximately 1600
(3)Airvol 350, >98% hydrolyzed, DP approximately 2400
(4)Magnesium stearate
(5)Guar gum
(6)Supplier: Super Wood Corp., Phillipps, WI

| | Recipe No. | | | | | |
|---|---|---|---|---|---|---|
| | 125 | 126 | 127 | 128 | 129 | 130 |
| Baking mold: plate | | | | | | |
| starch(1) | 100 | 100 | 100 | 100 | 100 | |
| PVAL, powder(2) | 7.5 | 10 | 10 | | | |
| PVAL solution, 10% in water(3) | | | | 110 | 110 | 82.5 |
| Release agent(4) | 0 | 0 | 1.0 | 1.0 | 0 | 0 |
| Release agent(5) | 0.75 | 1.0 | 1.0 | 1.0 | 1.5 | 0.9 |
| Water | 110 | 110 | 110 | 110 | 110 | 110 |
| plate weight, 50% rH conditioned | 17.2 | 17.7 | 17.4 | 17.5 | 17.4 | 16.9 |
| Baking time (sec) | 110 | 110 | 110 | 110 | 110 | 110 |
| Adhesion | no | no | no | no | no | no |
| Baking residues | no | no | no | no | no | no |
| Discoloration | no | no | no | no | no | no |

(1)Potato starch (Agrana, A)
(2)Airvol 523S, 88% hydrolyzed, DP approximately 1600
(3)Airvol 350, >98% hydrolyzed, DP approximately 2400
(4)Magnesium stearate
(5)Polymethylhydrogensiloxane, Dow Corning 1107 fluid

| Recipe No. | 131 | 132 | 133 | 134 | 135 | 136 |
|---|---|---|---|---|---|---|
| Baking mold: plate | | | | | | |
| Potato starch (1a) | 100 | 100 | 100 | | 100 | 100 |
| Wheat starch (1b) | | | | 100 | | |
| Waxy potato starch(1c) | | | | | | |
| PVAL, powder(2) | 16.7 | 16.7 | 10 | 10 | | |
| PVAL-solution, 10% in water(3) | | | | | 0 | 100 |
| Release agent(4) | 5.0 | 5.0 | 3.0 | 2.0 | 2.0 | 2.0 |
| Release agent(5) | 0 | 0 | 0 | 0 | 0 | 1.0 |
| Thickening agent(6) | 0.83 | 0.83 | 0.5 | 1.0 | 0.5 | 0 |
| Aspen fiber(7) | 0 | 0 | 5 | 0 | 0 | 0 |
| Mineral filler(8) | 66.7 | 66.7 | 0 | 0 | 0 | 0 |
| Wax powder(9) | 0 | 8.3 | 0 | 0 | 0 | 0 |
| Water | 216.7 | 216.7 | 210 | 260 | 114 | 30 |
| plate weight, after baking | 18.0 | 22.0 | 10.0 | 7.7 | 8.4 | 8.0 |
| Baking time (sec.) | 60 | 60 | 70 | 70 | 50 | 60 |
| Adhesion | no | slight | no | no | no | no |
| Baking residues | slight | slight | no | no | no | no |
| Discoloration | no | no | no | no | no | no |
| Load until break (N), 40% rH | 43 | 55 | | | | |
| Elongation to break (mm) 40% rH | 2.7 | 2.8 | | | | |
| Load until break (N), 55% rH | 48 | 50 | 46 | 43 | 41 | 68 |
| Elongation to break (mm) 55% rH | 3.6 | 3.9 | 5.8 | 5.5 | 4.4 | 6.3 |

(1a)Potato starch (Agrana, A)
(1b)Wheaten corn starch (Starch Australasia, Australia)
(1c)Potato amylopectin (Lyckeby Starjeksebm S)
(2)Airvol 523S, 88% hydrolyzed, DP approximately 1600
(3)Airvol 350, >98% hydrolyzed, DP approximately 2400
(4)Magnesium stearate
(5)Polymethyldrogensiloxane, Dow Corning 1107 fluid
(6)Guar gum
(7)Supplier: Super Wood Corp., Philipps, WI
(8)Special Extender Naintsch BC-60, (Luzenac Naintsch, A)
(9)Hoechst Wachs OP Puler fein, (Hoechst, Germany)

The significant change in baking performance when powdered polyvinyl alcohol is used was especially surprising. It contributes both to shortening of the baking times and to an increase in weight and in the stability of the molded articles, even though because of an increase in viscosity when the polyvinyl alcohol powder is added, the amount of water in the recipe must be increased. A combination of adding powdered polyvinyl alcohol with inorganic fillers or organic fibrous materials in powdered form is especially advantageous.

This must be a specific unexpected property of polyvinyl alcohol, since other hydrophilic polymers, such as various hydrocolloids, with a similarly viscosity-increasing effect, do not exhibit this property. It can only be suspected that this has to do with the low compatibility between polyvinyl alcohol and starch (see "Mowiol Polyvinylalkohol" [Mowiol polyvinyl alcohol], company publication by Hoechst AG, 1984), or with the only-partial solubilization of the polyvinyl alcohol. On the microscopic level, this could lead to reduced pore growth in the baking process and thus to greater density of the molded articles, but it simultaneously makes the escape of steam easier and thus reduces the baking time relative to the proportion of water.

Electron micrographs show a higher-viscosity flow in the baking mold or better cohesion at the surface of the molded article, which is demonstrated also by the reduction in visible microscopic pores.

Another surprising observation (recipes 38 and 41) is that the addition of glycerin, which is a known plasticizer for polyvinyl alcohol, does not further increase the flexibility of the molded articles, measured by bend stress testing. In fact, a reduction was observed, although this could also be ascribed to the worsening of the baking performance (steaming out). Thus in example 41, for instance, there were also unmolding problems, and the baking time was increased.

The use of polyvinyl alcohol improves the mechanical properties of the molded articles, especially when there is a change in humidity, as shown by the following comparison:

Each 4 to 5 specimens are equilibrated at room temperature for one day at various relative humidities. Then by texture measurement, the breaking load (Fm), the deformation travel (Lm) and the work in joules (Wm) expended for the purpose are determined.

| Recipe No. | % rF | Weight, g | Fm (N) | Lm (mm) | Wm (J) |
|---|---|---|---|---|---|
| 13 | 22 | 15.5 | 74 | 3.0 | 0.11 |
|  | 50 | 15.2 | 95 | 4.2 | 0.21 |
|  | 80 | 15.7 | 98 | 6.3 | 0.35 |
| 31 | 22 | 12.5 | 126 | 4.2 | 0.31 |
|  | 50 | 12.1 | 149 | 5.8 | 0.48 |
|  | 80 | 12.9 | 111 | 6.7 | 0.43 |

Example 13 (reference without polyvinyl alcohol) shows the following:
1. Despite increased weight, a reduced breaking load Fm and deformability to break Lm.
2. The work Wm to be expended for the deformation to break exhibits a significant rise, especially for low humidity.

These data indicate a greater flexibility of the molded articles.

Forming a flexible hinge as a connection between two mold halves has thus far been an unsolved problem in the production of starch-based molded articles. Admittedly, via a higher moisture absorption in conditioning, for instance at 75% relative humidity, the comparison recipes (No. 32 and 37) are also flexible enough that an unmolded hinge can be actuated repeatedly by opening and closing without breaking. Nevertheless, even at medium humidities around 40 to 60%, the vulnerability to breakage is so high that reliable function of such a hinge no longer exists.

Recipes No. 33–36 and 38–42, however, exhibit reliable function: actuation at least ten times at 50% relative humidity.

Examples 58, 59: comparison examples without polyvinyl alcohol; they have high water absorption, lesser breaking load and stretchability.

Examples 60–63: the use of polyvinyl alcohol increases the breaking load and the stretchability.

The more highly diluted recipe 61 produces very lightweight molded articles, along with a tendency to adhesion and a slight formation of residues on the baking molds. A remedy is provided here by a more-effective release agent (see recipe 92). As recipes 62 and 63 show, it is also possible to use higher doses of polyvinyl alcohol (about 38% polyvinyl alcohol to starch in 63), but without producing marked improvements in mechanical performance.

Examples 64–69, with various types of high- and medium-molecular polyvinyl alcohol, show positive effects on the breaking load and the stretching performance. From example 65, the effect of great dilution or low viscosity on the adhesive action of baking compositions that contain polyvinyl alcohol is again apparent.

Examples 70–74: 70 and 73 are comparison examples with cornstarch and wax cornstarch, respectively. The mechanical parameters are somewhat below those of molded articles of potato starch, but they are also improved by polyvinyl alcohol. In example 71, a certain adhesive effect of low-viscosity recipes can again be seen.

Examples 75–84: The use of $Ca(OH)_2$ in recipes 75–82 produces comparatively denser, heavier and hence more-solid molded articles, but conversely the stretchability is slightly reduced. Using polyvinyl alcohol jointly together with $Ca(OH)_2$ reduces the water absorption here significantly (recipes 77, 78, 81, 82). $Ca(SO_4)$ also shows this influence (see recipes 80, 83 and 84). The baking residues formed by calcium hydroxide are unproblematic from a baking standpoint; no adhesion; no buildup of thicker layers.

Examples 85–90: Cross-linking reagents based on zirconium salt increase the product weight and the breaking load; together with polyvinyl alcohol, the water absorption is also especially effectively reduced.

Examples 91–95: Example 91, as a comparison example, exhibits the aforementioned adhesion problem in low-viscosity, more heavily diluted baking compositions, which can be avoided by monostearyl citrate.

Examples 96–101: Use of polyvinyl alcohol powder; comparison examples with and without $Ca(OH)_2$.

Examples 102–109: Note the excellent elongation of potato amylopectin/PVOH plates at 20% humidity (#103) and also the good elongation of waxy maize/PVOH plates (#107). This is surprising since it is known in the art that the flexibility of extruded foams made from pure starch decreases as amylopectin content increases. In the present examples, it is hypothesized that PVOH occupies the continuous phase, thus leading to higher elongation to break.

Examples 110–117: As shown by recipe No. 110, regular high amylose corn is not suitable. For high amylose corn starch derivates, a minimum solids content over 35% is recommended.

Examples 118–119: Plates can be made from mixtures of starch and 15% polyvinyl alcohol even though such batters are very viscous.

Examples 120–124: In amylopectin starches (see also example 102–109) compared to regular starches we see higher strength increase, when PVAL is added, especially at low and high humidities. We assume, because here is no amylose to leach into the PVAL phase and make it less strong and flexible. Therefore the influence of fibers in example 124 is not as large as in former examples, e.g. of corn starch-fiber combinations.

Examples 125–130: Some examples with PVAL powder or solution together with different release agent or their combination.

Examples 131–136: Some more examples, 131 and 132 with higher concentration of inorganic fillers. Due to the additon of PVAL these still show acceptable mechanical properties.

We claim:

1. A method for producing disposable, thin-walled molded articles comprising:
   providing a multi-part mold having a lower mold member;
   preparing a starch-based baking composition which includes a starch component, water at a proportion of about 100% to about 360% by weight, relative to the starch component, and a release agent, wherein the starch component is at least one of starch, a starch mixture, flour, a flour mixture, and a starch derivative;
   adding polyvinyl alcohol in a quantity of about 0.5% to about 40% by weight, relative to the starch component, to the baking composition, wherein the polyvinyl alcohol has a degree of polymerization of over 1000;

introducing the starch-based baking composition into the lower mold member;

baking the baking composition within the multi-part mold to remove sufficient water by evaporation so as to substantially solidify the starch-based baking composition; and removing the substantially solidified starch-based composition from the mold and conditioning it to a moisture content of about 6% by weight to about 22% by weight.

2. A method according to claim 1, which further comprises adding at least one optional additive to the baking composition which is at least one of:

thickening agent selected from the group consisting of swelling starch, pregelatized starch, baking waste, guar flour, pectin, carob seed flour, carboxymethylcellulose, gum arabic, and mixtures thereof;

a fibrous material selected from the group consisting of cellulose-rich raw materials, plant materials, fibers of plastic, glass, metal, carbon materials, and mixtures thereof;

a nonfibrous filler material selected from the group consisting of calcium carbonate, coal, talcum, titanium dioxide, silica gel, aluminum oxide, shellac, soy protein, powdered wheat gluten, powdered egg white from chicken eggs, powdered casein, and mixtures thereof;

a powdered pigment;

a cross-linking agent selected from the group consisting of zirconium salts, calcium salts, and mixtures thereof;

a zirconium salt as a structural stabilizer selected from the group consisting of ammonium zirconium carbonate, ammonium zirconium acetate, and mixtures thereof;

a preservative; and an antioxidant.

3. A method according to claim 1, which further comprises selecting the release agent from the group of release agents consisting of one or more medium-chained fatty acids, long-chained fatty acids, substituted fatty acids, salts thereof, and derivatives thereof.

4. A method according to claim 3, which further comprises selecting the fatty acid derivatives from the group consisting of acid amides and a polymethyl hydrogen siloxane.

5. A method according to claim 1, which further comprises selecting the polyvinyl alcohol with a degree of polymerization of over 1600.

6. A method according to claim 1, which further comprises selecting the polyvinyl alcohol with a degree of polymerization of over 2000.

7. A method according to claim 1, wherein the step of adding polyvinyl alcohol comprises adding the polyvinyl alcohol, prior to adding the water, in finely powdered form to all other powdered ingredients and intimately mixing the resulting dry mixture, and subsequently forming a homogeneous suspension by adding the water in a proportion of 100 to 300% by weight, relative to the starch component.

8. A method according to claim 7, wherein the polyvinyl alcohol is added at a proportion of 0.5 to 24% by weight, relative to the starch component, and the the polyvinyl alcohol has a degree of polymerization of over 1600.

9. A method according to claim 7, wherein the polyvinyl alcohol has a degree of polymerization of over 2000.

10. A method according to claim 7, wherein the step of adding water comprises adding the water at 100 to 240% by weight, relative to the starch component.

11. A method according to claim 1, wherein the step of adding polyvinyl alcohol comprises admixing polyvinyl alcohol in the form of an aqueous solution at 0.5% to 40% by weight to the baking composition.

12. A method according to claim 11, wherein the step of adding polyvinyl alcohol comprises adding and aqueous solution having up to about 15% by weight polyvinyl alcohol.

13. A method according to claim 1, wherein the step of adding polyvinyl alcohol comprises adding fully-hydrolyzed polyvinyl alcohol.

14. A method according to claim 1, which comprises, prior to the placing step, holding the baking composition for a period of at least 30 minutes.

15. A method according to claim 1, which comprises, prior to the placing step, holding the baking composition for a period of between 45 and 60 minutes.

16. A method according to claim 1, wherein the release agent is selected from the group consisting of a stearate of magnesium, of calcium and of aluminum, and is added at 0.05 to 20% by weight, relative to the starch component, and at least 10% relative to a concentration of the polyvinyl alcohol.

17. A method according to claim 1, wherein the release agent is a polymethyl hydrogen siloxane added at 0.025 to 11% by weight, relative to the starch component, and at least 5% by weight relative to a concentration of the polyvinyl alcohol.

18. A method according to claim 1, wherein the release agent is monostearyl citrate added at 0.025 to 12% by weight, relative to the starch component, and at least 5% by weight relative to a concentration of the polyvinyl alcohol, and with the proviso that at concentrations above 0.5% by weight the pH of the baking composition is maintained at above 5.0.

19. A method according to claim 18, wherein the pH of the baking composition is maintained above 5.0 by neutralizing with basic substances selected from the group consisting of sodium hydroxide, potassium hydroxide, ammonia, water glass, and calcium hydroxide in solution or powder form.

20. A method according to claim 18, wherein the pH of the baking composition is maintained at above 6.0.

21. A method according to claim 1, wherein the release agent is an arbitrary mixture of release agents selected from the group consisting of stearates, polymethyl hydrogen siloxane, and monostearyl citrate, and added at 0.025 to 20% by weight, relative to the starch component.

22. A method according to claim 21, wherein the release agent is a mixture of polymethyl hydrogen siloxanes and monostearyl citrate.

23. A method according to claim 1, wherein the baking composition includes compounds forming ions during the baking step for modifying the starch component.

24. A method according to claim 23, wherein the ion-forming compounds are selected from the group consisting of calcium hydroxide and calcium sulfate.

25. A method according to claim 1, wherein the starch and polyvinyl alcohol become at least partially cross-linked.

26. A method for producing disposable, thin-walled molded articles comprising:

providing a starch-based composition including starchy water, a mold release agent, and polyvinyl alcohol;

introducing the starch-based composition into a heated mold that allows for the release of water vapor therefrom;

heating the starch-based composition within the mold so as to evaporate sufficient of the water and yield a substantially solidified starch-based composition;

removing the substantially solidified starch-based composition from the mold; and allowing the starch-based composition to equilibrate with ambient moisture so as to have a moisture content of about 6% to about 22% by weight of the arch-based composition.

27. A method for producing disposable, thin-walled molded articles comprising:

providing a starch-based composition including starch, water, a mold release agent, and polyvinyl alcohol;

introducing the starch-based composition into a heated mold that allows for the release of water vapor therefrom;

heating the starch-based composition within the mold so as to evaporate the water to less than 4% by weight and yield a substantially solidified starch-based composition;

removing the substantially solidified starch-based composition from the mold; and conditioning the starch-based composition to have a moisture content of about 6% to about 22% by weight of the starch-based composition.

* * * * *

UNITED STATES PATENT AND TRADEMARK OFFICE
CERTIFICATE OF CORRECTION

PATENT NO.   : 6,146,573
DATED        : November 14, 2000
INVENTOR(S)  : Randal L. Shogren; John W. Lawton Jr.; Karl Tiefenbacher It is certified that error appears in the above-identified patent and that said Letters Patent is hereby corrected as shown below:

Column 3,
Line 5, after "composition" change "if" to -- is --
Line 13, after "magnitude less" change "that" to -- than --

Column 4,
Line 4, after "over 1600" insert -- , -- (comma)
Line 15, after "1600" insert -- , -- (comma)
Line 41, after "viscosity" change "(mpas" to (mPas --

Column 10,
Line 28, after "88% hydrolyzed, DP" change "approxinately" to -- approximately -- (m not n)

Column 21,
Line 7, after "PVAL solution, 0" change "0)" to -- 0 --

Column 26,
Line 41, after "because" change "here" to -- there --

Column 28,
Line 6, after comprises adding" change "and" to -- an --
Line 66, after "composition including" change "starchy" to -- starch, --

Column 29,
Line 11, after "by weight of the" change "arch-based" to -- starch-based --

Signed and Sealed this

Eighteenth Day of December, 2001

Attest:

JAMES E. ROGAN
*Attesting Officer*   *Director of the United States Patent and Trademark Office*